(12) United States Patent
Kang et al.

(10) Patent No.: US 7,468,603 B2
(45) Date of Patent: Dec. 23, 2008

(54) ROTARY MANIPULATION TYPE INPUT APPARATUS

(75) Inventors: Eung-Cheon Kang, Hwaseong-si (KR); Sang-Jin Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 68 days.

(21) Appl. No.: 11/546,903

(22) Filed: Oct. 13, 2006

(65) Prior Publication Data

US 2007/0194785 A1    Aug. 23, 2007

(30) Foreign Application Priority Data

Feb. 22, 2006   (KR) ...................... 10-2006-0017204

(51) Int. Cl.
*G01B 7/30*    (2006.01)
(52) U.S. Cl. .............................. 324/207.25; 324/207.2; 324/207.21
(58) Field of Classification Search . 324/207.2–207.25, 324/173–174; 338/32 R, 32 H
See application file for complete search history.

(56) References Cited

U.S. PATENT DOCUMENTS

| 6,396,259 | B1 * | 5/2002 | Washeleski et al. .... 324/207.22 |
| 7,095,198 | B1 * | 8/2006 | O'Brien ...................... 318/432 |
| 7,322,115 | B2 * | 1/2008 | Besier et al. ................ 33/1 PT |
| 2003/0019113 | A1 * | 1/2003 | Kofink et al. ............... 33/1 PT |
| 2005/0022617 | A1 * | 2/2005 | Sano ......................... 73/865.9 |

* cited by examiner

*Primary Examiner*—Jay M Patidar

(57) ABSTRACT

A rotary input apparatus is disclosed. The rotary input apparatus comprising a rotatable wheel, a multi-pole ring-type magnet secured to the bottom of the wheel to rotate together with the wheel, a printed circuit board on which one or more detection elements are mounted that are capable of detecting the rotation of the magnet and in which one or more receiving holes are formed in correspondence with the detection elements, with at least a portion of the detection elements inserted in the receiving holes, and a base rotatably supporting the wheel on which the printed circuit board is positioned, can reduce the thickness of input apparatus.

7 Claims, 3 Drawing Sheets

ROTARY MANIPULATION TYPE INPUT APPARATUS

CROSS-REFERENCE TO RELATED APPLICATIONS

This application claims the benefit of Korean Patent Application No. 2006-0017204 filed with the Korean Intellectual Property Office on Feb. 22, 2006, the disclosure of which is incorporated herein by reference in its entirety.

BACKGROUND

1. Technical Field

The present invention relates to a rotary input apparatus.

2. Description of the Related Art

In general, a mobile terminal has the numbers 0-9 and the symbols * and # on a keypad of 12 keys. In addition to the numbers, there are also alphabet letters as well as consonants and vowels of Korean letters marked on such a keypad, to enable the input of information including numbers and letters. There are also navigation keys formed above the keypad equipped with a variety of functions such as phone number search, writing and managing text messages, and connecting to the Internet, etc. There are various forms of navigation keys, such as button types and rotary types, etc., but the use of rotary input apparatus is currently increasing, as they enable various functions such as menu browsing, etc.

Also, as the latest mobile terminals are becoming more and more slim in shape, so also is there a demand for these rotary input apparatus to be slim. However, since in conventional rotary input apparatus there are Hall sensors or MR sensors, etc., mounted on the printed circuit board, etc., there is a limit to how much the thickness can be decreased.

SUMMARY

The present invention aims to provide a rotary input apparatus which has a reduced thickness, and which outputs rotation speed, direction, and angle, etc., to allow various types of input.

One aspect of the invention provides a rotary input apparatus comprising a rotatable wheel; a multi-pole ring-type magnet secured to the bottom of the wheel to rotate together with the wheel; a printed circuit board, on which one or more detection elements are mounted that are capable of detecting the rotation of the magnet, and in which one or more receiving holes are formed in correspondence with the detection elements, with at least a portion of the detection elements inserted in the receiving holes; and a base, rotatably supporting the wheel, on which the printed circuit board is positioned.

The rotary input apparatus according to embodiments of the invention may include one or more of the following features. For example, the base may have one or more insertion holes in which a portion of the detection elements is positioned in correspondence with the receiving holes. The detection element may be a Hall sensor or an MR sensor.

The rotary input apparatus may further comprise a holder, secured to the base, for rotatably supporting the wheel, and the base may have one or more fastening holes, while the holder may have one or more fastening portions inserted into the fastening holes.

The holder may have a plurality of push protrusions protruding downwards, and the printed circuit board may have one or more dome buttons pressed by the push protrusions. Also, the holder may have a center hole and one or more ledges formed adjacent to the center hole, the wheel may have securing protrusions protruding downwards, and a washer in which one or more rotation holes of predetermined central angles are formed may be inserted onto the ledges, with the securing protrusions inserted into the rotation holes.

Further, the holder may have one or more holder holes, formed in positions corresponding to the detection elements, in which at least portions of the detection elements are positioned, while the wheel may have a center key formed at its center, and the printed circuit board may have dome buttons that are to be pressed by the center key.

Additional aspects and advantages of the present invention will be set forth in part in the description which follows and in part will be obvious from the description, or may be learned by practice of the invention.

DETAILED DESCRIPTION

Below, embodiments of the rotary input apparatus according to the invention will be described in more detail with reference to the accompanying drawings. In the description with reference to the accompanying drawings, those components are rendered the same reference number that are the same or are in correspondence regardless of the figure number, and redundant explanations are omitted.

Figure 1:
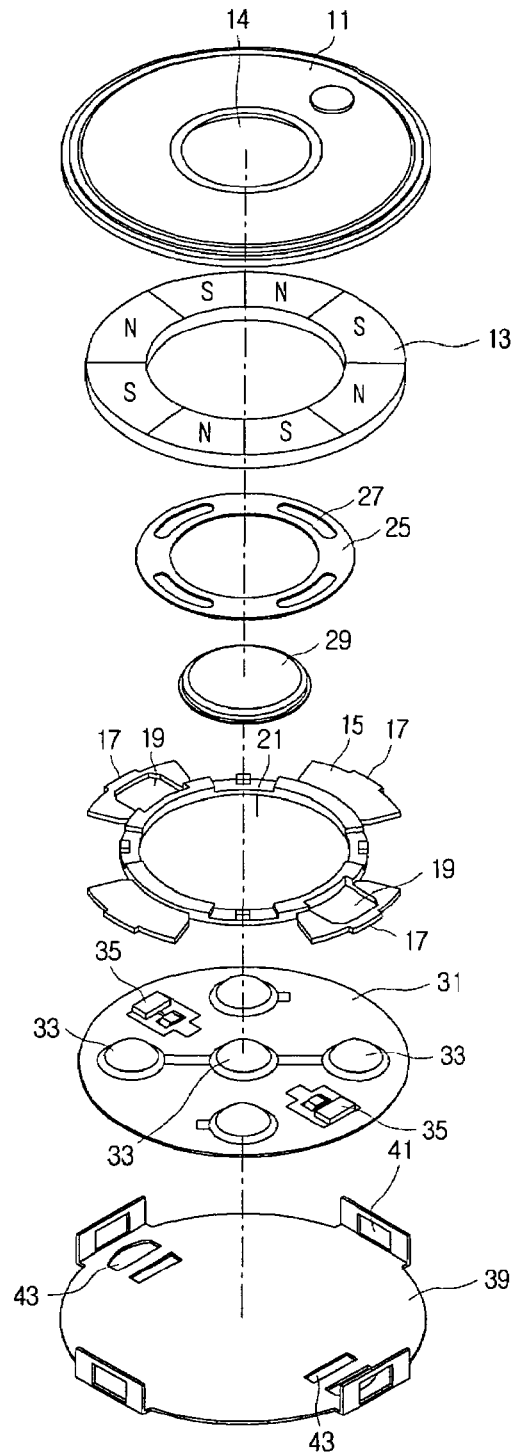
FIG. 1 is a perspective view of a rotary input apparatus in an unassembled state according to an embodiment of the invention.
Figure 2:
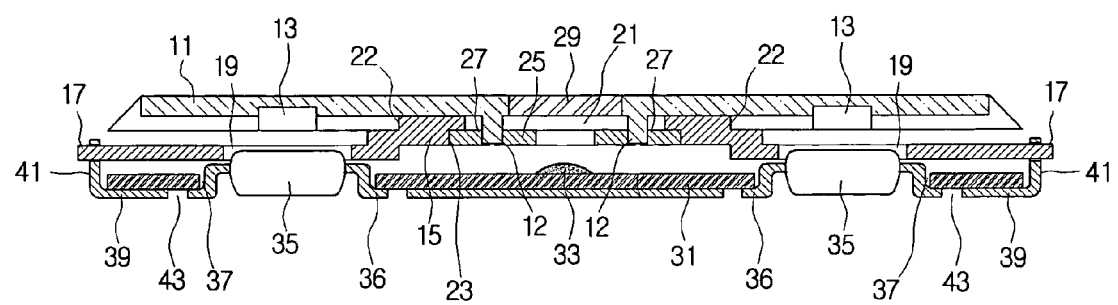
FIG. 2 is a cross-sectional view of the rotary input apparatus of FIG. 1 in an assembled state.

Referring to FIGS. 1 and 2, a rotary input apparatus according to an embodiment of the invention comprises a rotatably joined wheel 11, a washer 25 defining the rotation angle of the wheel 11, a center key 29 joined at the center of the wheel 11, a ring-shaped magnet 13 secured to the bottom of the wheel 11 which rotates together with the wheel 11, the holder 15 joined to a base 39 for rotatably supporting the wheel 11, a printed circuit board 31 secured to the upper surface of the base 39, and Hall sensors 35 positioned in grooves of the printed circuit board 31 which are detection elements for sensing the rotation of the magnet 13.

A feature of the rotary input apparatus according to this embodiment is that on the printed circuit board 31 having the Hall sensors 35, i.e. the detection elements, there are receiving holes 37 formed, in which at least portions of the Hall sensors 35 can be positioned, so that the thickness of the rotary input apparatus may be reduced by the thickness of a receiving hole 37. Moreover, by additionally forming insertion holes 43 on the base 39 in which may be positioned the Hall sensors 35, i.e. the detection elements, the thickness of the rotary input apparatus may further be reduced by the thickness of an insertion hole 43.

The wheel 11 is generally shaped as a circular plate, with a center hole 14 formed in the center through which the center key 29 may be inserted. The wheel 11 has a plurality of securing protrusions 12 adjacent to the center hole 14 that protrude downwards. The securing protrusions 12 are inserted into the rotation holes 27 of the washer 25, whereby the wheel 11 is secured to the holder 15. The wheel 11 is secured rotatably to the holder 15. Also, on the bottom surface of the wheel 11 is secured the magnet 13, which is magnetized to have multiple poles. The wheel 11 is rotated together with the magnet 13 by user operation, whereby a variety of inputs are made as the Hall sensors 35 sense the rotation angle, direction, and speed, etc., of the magnet 13. Also, a portion may be pressed by the user, so that a push protrusion formed on the reverse side of the holder 15 presses the upper surface of a dome button 33 to activate a separate function.

The securing protrusions 12, as illustrated in FIG. 2, are inserted through the center hole 21 of the holder 15 and the rotation holes 27 of the washer 25. The washer 25 is inserted and secured onto the center of the holder. 15, whereby the wheel 11 is secured to the holder 15. The central angles of the rotation holes 27 of the washer 25, through which the securing protrusions 12 are inserted, define the angle by which the wheel 11 is able to rotate.

The magnet 13 is attached to the bottom surface of the wheel 11 to be rotated together with the wheel 11, and such rotation of the magnet 13 is sensed by the Hall sensors 35 for an input based on the rotation angle. The magnet 13 may be in the form of a ring magnetized to have multiple poles, where the Hall sensors 35 may detect the rotation angle, direction, and speed of the wheel 11 according to the changes in N- and S-poles above the Hall sensors 35.

The holder 15 is secured to the base 39 and rotatably supports the wheel 11. Also, the holder 15 supports the wheel 11, such that when the particular force applied on the wheel 11 is removed, the wheel 11 is returned to its original position due to the elasticity of the holder 15 itself. As illustrated in FIG. 1, the holder 15 has a center hole 21 in the middle, and holder holes 19 are formed in the fastening portions 17 that protrude in four directions around the center hole 21. The holder 15 also has ledges 23 formed adjacent to the center hole 21.

The fastening portions 17 are protrusion portions formed in particular intervals around the holder 15, and as illustrated in FIG. 2, are inserted into the fastening holes 41 to prevent the base 39 from becoming detached. The fastening portions 17 are made of metal or plastic, etc., to have a certain degree of elasticity, and this elasticity allows the wheel 11 to recover its original position, even when a particular portion of the wheel 11 is pressed so that the wheel 11 becomes tilted.

The holder holes 19 in the fastening portions 17 are formed in correspondence with the Hall sensors 35 mounted on the printed circuit board 31, and as illustrated in FIG. 2, hold portions of the Hall sensors 35. The center hole 21 is formed in the center of the holder 15. Also, the wheel 11 is rotatably inserted onto a perimeter 22 forming the center hole 21, to prevent the wheel 11 from becoming detached. The ledges 23, as illustrated in FIG. 2, are formed adjacent to the center hole 21. The washer 25 is inserted and secured onto the ledges 23.

As illustrated in FIG. 1, the washer 25 is generally shaped as a donut, with a plurality of rotation holes 27 formed in certain intervals along the ring. The washer 25 is inserted and secured onto the ledges 23 to define the angle by which the wheel 11 is able to rotate. While there are four arc-shaped rotation holes 27 illustrated in this embodiment, the invention is not thus limited, and it is to be appreciated that the number and central angles of the rotation holes 27 may be changed according to design considerations. For example, one or two rotation holes 27 formed along the ring of the washer 25 with a central angle of 180° or 360° may be used for the rotation holes 27.

The center key 29 is inserted through the center hole 14 of the wheel 11 and supported by elastic rubber (not shown), etc. The center key 29 is pressed by the user to perform a particular function, examples of which include connecting to the Internet or receiving DMB (Digital Multimedia Broadcasting), etc.

The printed circuit board 31 has the shape of a circular plate in correspondence with the base 39, with a plurality of dome buttons 33 formed on one side in correspondence with the push protrusions formed on the reverse side of the holder 15. Also, there are receiving holes 37 formed on the printed circuit board 31 in which at least portions of the Hall sensors 35 may be inserted.

The dome buttons 33 are pressed by push protrusions (not shown) formed on the reverse side of the holder 15 to perform separate functions. While in this embodiment the dome buttons 33 are illustrated as being pressed by means of the wheel 11, the invention is not thus limited, and any composition may be used in which certain pressing performs separate functions. For example, pressure sensors or contact sensors may also be used instead of the dome buttons 33.

Figure 3:
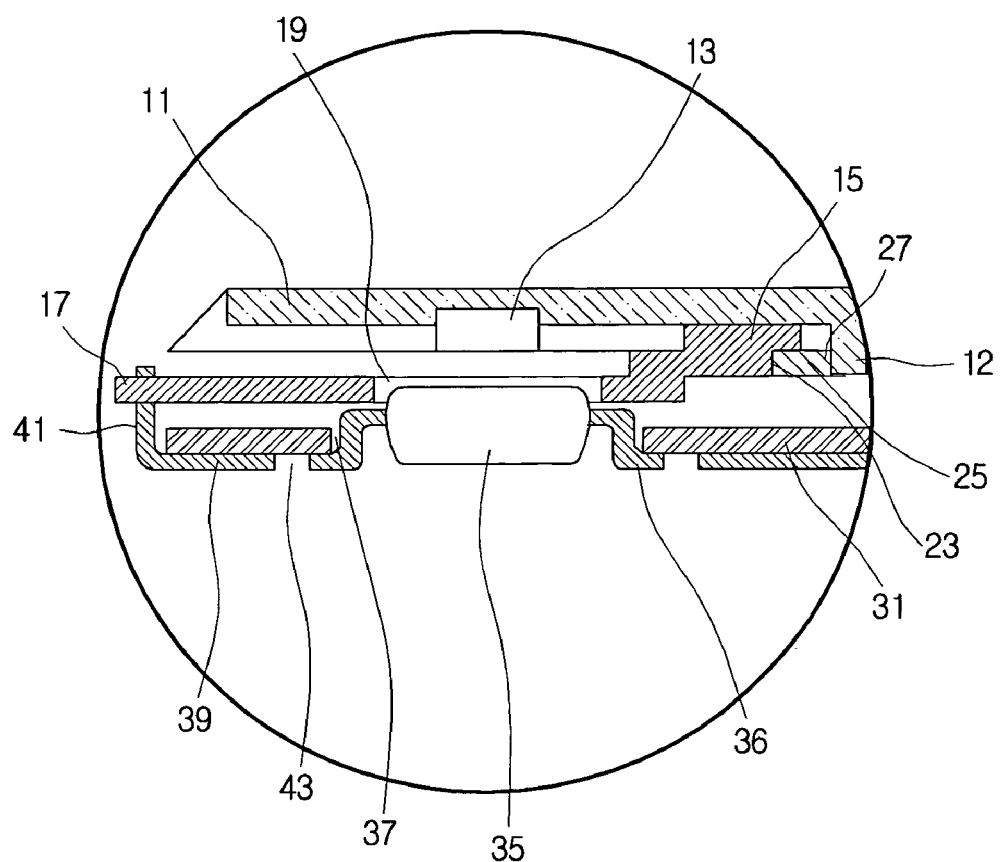
FIG. 3 is a magnified cross-sectional view of a rotary input apparatus according to an embodiment of the invention illustrating sensors inserted into the base and printed circuit board.

The receiving holes 37 are formed on the printed circuit board 31 in correspondence with the holder holes 19 of the holder 15, and as illustrated in FIGS. 2 and 3, at least portions of the Hall sensors 35 are positioned in the receiving holes 37. Thus, compared to the case of mounting Hall sensors 35 on the upper surface of the printed circuit board 31, the thickness of the input device in the present embodiment may be reduced by the by the thickness of a receiving hole 37.

The detection element may be a Hall sensor (Hall effect sensor), which is a silicon semiconductor using the effect of electromotive forces being generated when electrons experience the Lorentz force in a magnetic field and their direction is curved. The Hall sensors generate electromotive forces that are proportional to the rotation of the magnet 13 attached to the wheel 11, which are transferred via the printed circuit board 31 to an outside control unit (not shown).

Of course, the detection element is not limited to Hall sensors, and any element may be used which can detect the rotation of the magnet 13. For example, MR (magneto-resistive) sensors or GMR (giant magneto-resistive) sensors may be used for the detection element. An MR sensor or a GMR sensor is an element of which the resistance value is changed according to changes in the magnetic field, and utilizes the property that electromagnetic forces curve and elongate the carrier path in a solid to change the resistance. Not only are MR sensors or GMR sensors small in size with high signal levels, but also they have excellent sensitivity to allow operation in low-level magnetic fields, and they are also superior in terms of temperature stability.

When the detection element consists of Hall sensors 35, the Hall sensors 35 are secured to the printed circuit board 31 by leads 36, where the leads 36 are inserted through the insertion holes 43 of the base 39 and secured to the reverse side of the printed circuit board 31.

The base 39, as illustrated in FIG. 1, has the shape of a circular plate, and rotatably supports the holder 15 and the wheel 11. The base 39 has fastening holes 41 around it in correspondence with the fastening portions 17 of the holder 15. The fastening portions 17 of the holder 15 are inserted into the fastening holes 41 of the base 39. Also, insertion holes 43 are formed on the base 39 in correspondence with the receiving holes 37 of the printed circuit board 31. As illustrated in FIG. 3, portions of the Hall sensors 35 are positioned in the insertion holes 43, whereby the thickness of the rotary input apparatus may further be reduced by the thickness of the insertion holes 43.

Below, a description will be given of the operation of a rotary input apparatus according to the present embodiment.

When a rotational force is applied by a user on an outer side of the center key 29, the wheel 11 is rotated while inserted onto the perimeter 22 of the holder 15, which causes the magnet 13 to rotate together. As the magnet 13 has a multiple number of alternately magnetized N- and S-poles, the Hall sensors 35 can sense the changes in poles due to the rotation of the magnet 13, to recognize the rotation direction, speed, and angle of the wheel 11. The Hall sensors 35 generate output signals corresponding to the rotation direction, rotation angle, and rotation speed of the wheel 11, which are transmitted via the printed circuit board 31 to an outside control unit, and the control unit identifies the output signals to perform an input corresponding to the rotation of the wheel 11.

Also, when an outer side of the center key 29 is pressed by a user, the wheel 11 is tilted in one direction while elastically supported by the holder 15, which causes the push protrusions (not shown) formed on the reverse side of the holder 15 to press the dome buttons 33. This allows each of the dome buttons 33 positioned on the printed circuit board 31 to perform its own function. For example, in the input apparatus illustrated in FIGS. 1 to 3, there are four dome buttons 33 in equal intervals that can be pressed by the push protrusions, where each dome button 33 may function as a hot key for launching a text message function, searching phone numbers, connecting to the Internet, or receiving satellite broadcasts, etc. In addition, the center key 29 may also perform a separate function when pressed by a user.

The present invention can thus provide a rotary input apparatus which has a reduced thickness, and which outputs rotation speed, direction, and angle, etc., to allow various types of input.

While the above description has pointed out novel features of the invention as applied to the embodiments disclosed above, it is to be construed that various permutations and modifications are included within the scope of the present invention.

What is claimed is:

1. A rotary manipulation type input apparatus, comprising:
   a rotatable wheel;
   a multi-pole ring magnet secured to the bottom of the wheel;
   a printed circuit board having one or more detection elements mounted thereon and having one or more receiving holes formed therein in correspondence with the detection elements, wherein at least a portion of the detection elements is inserted in the receiving holes;
   a base rotatably supporting the wheel and having the printed circuit board positioned thereon;
   a center key formed at the center of the wheel; and
   a dome button arranged on the printed circuit board such that the center key is enabled to press the dome button.

2. The rotary manipulation type input apparatus of claim 1, wherein the base has one or more insertion holes in which at least a portion of the detection elements is positioned in correspondence with the receiving holes.

3. The rotary manipulation type input apparatus of claim 1, wherein the detection element is a Hall sensor or an MR sensor.

4. The rotary manipulation type input apparatus of claim 1, further comprising a holder, secured to the base and supporting the wheel such that the wheel is rotatable.

5. The rotary manipulation type input apparatus of claim 4, wherein
   the base has one or more fastening holes, and
   the holder has one or more fastening portions inserted into the fastening holes.

6. The rotary manipulation type input apparatus of claim 5, wherein
   the holder has a center hole and one or more ledges formed adjacent to the center hole,
   the wheel has securing protrusions protruding downwards,
   and a washer having one or more rotation holes of predetermined central angles formed therein is inserted onto the ledges, the securing protrusions being inserted into the rotation holes.

7. The rotary manipulation type input apparatus of claim 4, wherein the holder has one or more holder holes, formed in positions corresponding to the detection elements, in which at least portions of the detection elements are positioned.

* * * * *